United States Patent [19]

Fornadley

[11] Patent Number: 4,957,785

[45] Date of Patent: Sep. 18, 1990

[54] LIGHT TRANSMISSIVE STONE STRUCTURE AND METHOD FOR MAKING SAME

[76] Inventor: Michael R. Fornadley, 208 Heston Dr., Mars, Pa. 16046

[21] Appl. No.: 173,272

[22] Filed: Mar. 25, 1988

[51] Int. Cl.[5] .......... B44F 1/06; G02B 5/08

[52] U.S. Cl. .......... 428/15; 156/63; 350/600; 362/405; 362/806; 428/38; 428/912.2

[58] Field of Search .......... 428/13, 15, 38, 912.2, 428/49; 63/1.1, 26; 362/337, 340, 806, 809; 350/600; 156/63

[56] References Cited

U.S. PATENT DOCUMENTS

| | | | |
|---|---|---|---|
| 1,608,670 | 11/1926 | Ransburg | 63/26 X |
| 1,808,780 | 6/1931 | Logan | 428/15 |
| 1,813,901 | 7/1931 | Bayne | 156/63 |
| 1,858,358 | 5/1932 | Cooper | 156/63 |
| 2,097,061 | 10/1937 | Graf | 428/13 X |
| 2,297,191 | 9/1942 | Parman | 428/15 X |
| 3,025 625 | 3/1962 | Colvin et al. | 156/63 X |
| 3,268,379 | 8/1966 | Baker | 428/49 X |
| 3,993,813 | 11/1976 | Grieco et al. | 428/38 |
| 4,378,392 | 3/1983 | Segel | 428/40 |
| 4,419,436 | 12/1983 | Kranser | 428/202 X |
| 4,767,676 | 8/1988 | Swarovski et al. | 156/63 X |
| 4,824,729 | 4/1989 | Livi | 350/600 X |

*Primary Examiner*—Henry F. Epstein
*Attorney, Agent, or Firm*—Buchanan Ingersoll

[57] ABSTRACT

A light transmissive structure made from stones and particularly crystal clusters and a method for making same is disclosed in which the stone is mounted to a preferably transparent or translucent back using an adhesive which is clear after hardening and does not discolor, so that when assembled, the structure will withstand normal handling and mounting into a desired structure without breaking.

10 Claims, 1 Drawing Sheet

LIGHT TRANSMISSIVE STONE STRUCTURE AND METHOD FOR MAKING SAME

FIELD OF THE INVENTION

The invention relates to a light transmissive structure made from crystals, gem stones and the like used for such things as lamp shades and chandeliers, and a method for making same.

DESCRIPTION OF THE PRIOR ART

Pieces of the earth have been classified as minerals, gems, ores and rocks. For purposes of this application, all of these natural materials will be called stones.

Stones are sometimes used for lamp shades and other light transmissive structures. To be useful for such applications the raw stone must be cut to size and then mounted in a setting or frame. Often a solder setting or frame is used. Some have proposed to mount or embed the stone in various plastics and ceramics. In this technique the stones are placed in molten or soft plastic or greenware which then hardens. One shortcoming of plastic structures is that they cannot be used in most light fixtures because the heat from a light bulb will cause the plastic to soften. Plastics also distort the light passing through the embedded stone. Some plastics change color over time typically as a result of the exposure to ultraviolet light.

It is well known that stones vary in hardness from one type to another type. Such hardness is often expressed through the Mohs scale in which a diamond, the hardest stone is ranked 10 and talc, the softest stone is ranked 1. Those stones which are not crystals and which have a Mohs hardness of greater than 1 can be cut into slabs which are thin enough to transmit light and strong enough to maintain their integrity. Many crystals, such as amethyst, grow on an matrix which normally is removed so that the stone has acceptable light transmissive properties. However, removal of the matrix weakens the crystal cluster. When crystal clusters are in this weakened condition, they will easily break apart. Prior to the present invention, the size of the pieces of stone which could be used in Tiffany style lamps and other light transmissive structures depended upon the material stength of the selected stone. For crystalline materials, the size of the crystal determines the size of the piece. Prior to the present invention the art has been unable to use crystal clusters in light transmissive structures.

Consequently, there is a need for a method and resulting structure which allows one to use crystal clusters or other stones in a light transmissive structure. When used, the crystals should be arranged so that no distortion of light, such as a change in color, occurs which is not attributable to the stone. There is also a need for a method which allows one to mount large numbers of light transmissive stones in close proximity to one another in a light transmissive structure of any desired size.

SUMMARY OF THE INVENTION

The present invention provides a method and structure in which crystal clusters and other stones can be assembled into a light transmissive structure in which the stone portion can be any desired size.

The present invention further provides a method and structure in which stones of any type can be mounted in close proximity in a light transmissive structure without sacrificing structural integrity of the stone.

The present structure accomplishes these objectives without distorting the light passing through the stone in any way.

DESCRIPTION OF THE PREFERRED EMBODIMENTS

Figure 1:
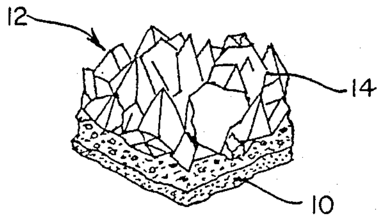
FIG. 1 is a perspective view of one type of crystal cluster as it occurs in nature.

As shown in FIG. 1, crystal clusters, such as amethyst, naturally occur as a cluster of crystals 12 on an opaque matrix 10. Amethyst crystals are purple in color and will allow light to pass through them. Because of the size, shape, arrangement and amount of pigment, the amount of light transmission varies among crystals. These variations are used by the artist to create different moods by varying the light source and type of light which strikes the crystal.

To be useful in a light transmissive structure, the matrix 10 must be cut from the crystals 12. Removal of the matrix greatly weakens the crystal cluster so that it will easily break apart along crystal interfaces 14. For that reason, only individual crystals of amethyst can be used in light transmissive structures.

Figure 2:
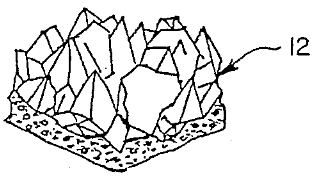
FIG. 2 is a perspective view of the crystal cluster of FIG. 1 after the matrix has been removed.
Figure 3:
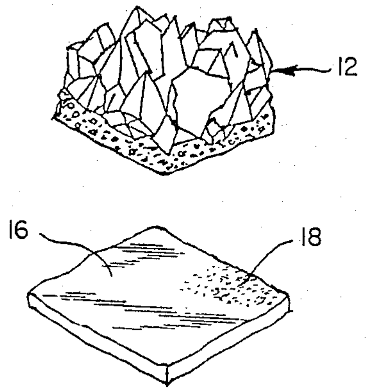
FIG. 3 is a perspective view of the crystal cluster of FIG. 2 positioned above a clear or translucent back prior to mounting.
Figure 4:
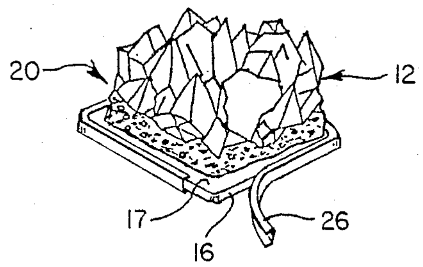
FIG. 4 is a perspective view of the crystal cluster of FIG. 2 after it has been mounted in accordance with the present invention.

I have discovered that cut crystal clusters such as shown in FIG. 2 can be used for large lighting devices, such as chandeliers and the like, by mounting the crystal cluster on a back which creates a composite structure that can be handled and mounted without breaking. As shown in FIGS. 3 and 4, the back 16 is preferably transparent. I prefer to use clear glass. Other clear materials as well as translucent materials can be used. One could also use a mirror as a back. An adhesive 18 is applied between the back 16 and the stone 12 as shown in FIG. 3. The adhesive must be strong enough to hold the stone to the glass during future processing and yet remain clear after it hardens. Such clarity should continue indefinitely. Furthermore, the adhesive when dry should not be adversely affected by temperature changes of the type normally encountered by lamps and windows. Few adhesives meet all of these standards. Methacrylic adhesive cured with ultraviolet light is one such material. I have found that pieces of amethyst glued to glass with methacrylic adhesives withstood rain, snow and prolonged exposure to light and prolonged exposure to light bulbs which heated the structure to about 250° F.

Figure 5:
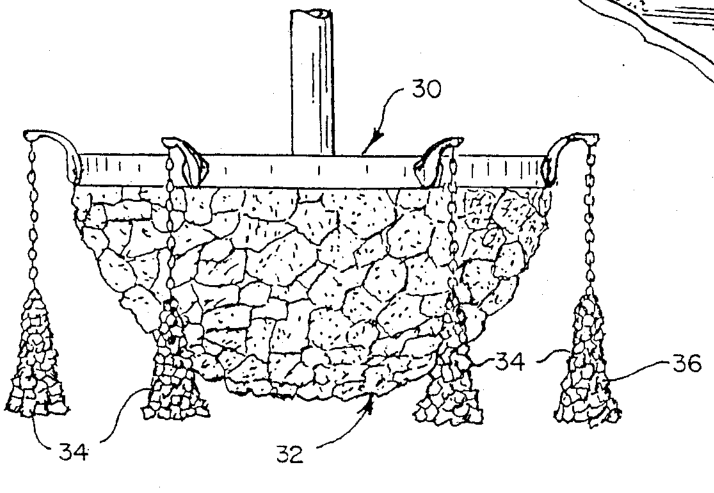
FIG. 5 is a chandelier made from crystal clusters mounted in accordance with the present invention.

After mounting crystal clusters of amethyst to the glass I have then used the resulting structures 20, which are like the one shown in FIG. 4, to form the hemispherical portion 32 of the chandelier 30 of FIG. 5. These structures 20 have amethyst portions which vary in size from about one inch to about seven inches across. The curvature of the hemisphere imposed a size limit on the span of the stones which I used. The crystal thickness varies from about one-eighth inch to about two inches. The resulting structures of FIG. 4 weighed from a few ounces to about four pounds. When assembled into a chandelier like that shown in FIG. 5, the resulting product weighed in excess of 300 pounds.

I have found that extending the glass 16 slightly beyond the crystal cluster to form a rim 17 shown in FIG. 4 extends the contact area for the solder used to assemble the pieces into the hemispherical portion 32. Adhesion can also be improved by applying a foil 26, preferably copper foil, to the edge of the glass as shown in FIG. 4.

The chandelier of FIG. 5 illustrates the creative capabilities provided by my method and structure. The trumpets 34 on the chandelier are five inches high. Each stone 36 is amethyst which has not been mounted in accordance with my invention. Because amethyst is fragile except as single crystals, I could use only single crystals none of which was larger than about one inch. In the hemisphere 32 mounted amethyst was used. There the size of the pieces was limited only by the curvature of the hemisphere.

Figure 6:
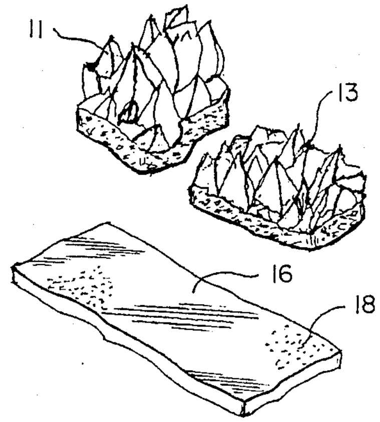
FIG. 6 is a perspective view showing how two different stones could be mounted.

My technique can be used to make light transmissive structures having more than one type or color of stone. As shown in FIG. 6, the stones 11 and 13 can be cut so that adjacent sides of stones fit snugly together. All stones are held in place by the transparent or translucent back 16 and adhesive 18. Yet, from the front it can appear that the stones have been formed by nature in their present position.

While I have shown and described a present preferred embodiment of the invention and have illustrated a present preferred method of practicing the same, it is to be distinctly understood that the invention is not limited thereto but may be otherwise variously embodied and practiced within the scope of the following claims.

I claim:

1. A light transmissive structure comprised of one of a transparent back and a translucent back and a light transmissive material selected from the group consisting of gems, ores and rocks mounted on said back with methacrylic adhesive which is clear and translucent after hardening will not discolor and when assembled the structure will withstand normal handling and mounting without breaking.

2. The structure of claim 1 wherein the light transmissive material is a natural crystal cluster.

3. The structure of claim 2 wherein the natural crystal cluster is a crystal cluster selected from the group consisting of rose quartz, blue quartz, citrine, amethyst, smoky quartz and milky quartz.

4. A natural crystal cluster structure comprised of a crystal cluster after its matrix has been removed, mounted on a glass back using methacrylic adhesive which provides the resulting crystal cluster structure with sufficient strength to withstand normal handling and mounting without breaking.

5. The structure of claim 4 wherein the back is a mirror.

6. A light transmissive structure comprised of one of a transparent back and a translucent back and a light transmissive mineral material selected from the group consisting of gems, ores and rocks mounted on said back with methacrylic adhesive which has been hardened by exposure to ultraviolet light thereby creating a bond that is clear and does not discolor, said bond having sufficient strength so that the structure will withstand normal handling without breaking.

7. The structure of claim 6 wherein the light transmissive material is a natural crystal cluster.

8. The structure of claim 7 wherein the natural crystal cluster is a crystal cluster selected from the group consisting of rose quartz, blue quartz, citrine, amethyst, smoky quartz and milky quartz.

9. A crystal cluster structure comprised of a natural crystal cluster after its matrix has been removed, mounted on a glass back with methacrylic light thereby creating a structure with sufficient strength to withstand normal handling without breaking.

10. The structure of claim 9 wherein the back is a mirror.

* * * * *

UNITED STATES PATENT AND TRADEMARK OFFICE
CERTIFICATE OF CORRECTION

PATENT NO. : 4,957,785

DATED : September 18, 1990

INVENTOR(S) : MICHAEL R. FORNADLEY

It is certified that error appears in the above-identified patent and that said Letters Patent is hereby corrected as shown below:

Column 4, line 37, after "methacrylic" insert --adhesive which has been hardened by exposure to ultraviolet--.

Signed and Sealed this

Twenty-sixth Day of November, 1991

*Attest:*

HARRY F. MANBECK, JR.

*Attesting Officer*

*Commissioner of Patents and Trademarks*